United States Patent
Johnston

(10) Patent No.: US 8,664,585 B2
(45) Date of Patent: Mar. 4, 2014

(54) SENSOR APPARATUS FOR DETECTING AND MONITORING A CRACK PROPAGATING THROUGH A STRUCTURE

(75) Inventor: Robert T. Johnston, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 470 days.

(21) Appl. No.: 12/945,957

(22) Filed: Nov. 15, 2010

(65) Prior Publication Data

US 2012/0119074 A1    May 17, 2012

(51) Int. Cl.
*G01J 1/04* (2006.01)

(52) U.S. Cl.
USPC .................................... 250/227.14

(58) Field of Classification Search
USPC ......................... 250/227.14–227.18
See application file for complete search history.

(56) References Cited

U.S. PATENT DOCUMENTS

| | | | | |
|---|---|---|---|---|
| 4,403,143 A * | 9/1983 | Walker et al. | | 250/227.11 |
| 5,227,731 A | 7/1993 | Prabhakaran et al. | | |
| 5,387,791 A | 2/1995 | Weiss | | |
| 5,525,796 A | 6/1996 | Haake | | |
| 5,698,848 A * | 12/1997 | Belk | | 250/227.11 |
| 5,965,877 A * | 10/1999 | Wood et al. | | 250/227.15 |
| 7,750,643 B2 | 7/2010 | Rose | | |
| 2009/0231578 A1 | 9/2009 | Ling et al. | | |
| 2009/0262331 A1* | 10/2009 | Burchardt et al. | | 356/32 |

FOREIGN PATENT DOCUMENTS

WO    2008105974 A2    9/2008

OTHER PUBLICATIONS

Special Gages KV; Crack Gages; http://solteccorp.com/Images/PDF/kyowa/straingages/KV%20Special%20Gages.pdf; SOLTEC Corporation, 2009.
OMEGA® Strain Gages; Crack and Diaphragm Gages; http://www.omega.com/Pressure/pdf/crack_propagation_strain_sg.pdf; Omega Engineering inc., 2003-2010.
Crack propagation gages—RDS20, RDS22, RDS40; http://www.hbm.com/en/menu/products/strain-gages-accessories/strain-gages-for-stress-analysis/single/categorie/universal-foil-strain-gages/product/crack-propagation-gages; Hottinger Baldwin Messtechnik GmbH, Germany, 1998-2009.
Strain Gages to Measure Crack Propagation SG Crack Propagation Gages; http://www.omega.ca/shop/pptsc.asp?ref=crack_propagation_strain_sg&Nav=pree02; OmegaEngineering, Inc., 2002.
Beam splitter; http://en.wikipedia.org/wiki/Beam_splitter; Wikimedia Foundation, Inc., Jul. 30, 2010.
Understanding Ball Lenses; http://www.edmundoptics.com/technical-support/optics/understanding-ball-lenses/?&pagenum=1; 2010, pp. 1-2, Edmund Optics Inc.

(Continued)

*Primary Examiner* — Thanh Luu

(57) ABSTRACT

A sensor apparatus is provided for detecting and monitoring a crack propagating through a structure. The sensor apparatus comprises: light source apparatus; detector structure; and a plurality of optical fibers having proximal and distal ends. The fibers may be spaced apart from one another and associated with the structure such that as a crack propagates through the structure, one or more of the optical fibers is broken by the crack. The optical fibers may receive light at the fiber proximal ends and the optical fibers may have a coating on the fiber distal ends capable of causing light to be returned toward the fiber proximal ends.

15 Claims, 6 Drawing Sheets

(56) References Cited

OTHER PUBLICATIONS

Donald M. Oglesby et al.; Development of Temperature Sensitive Paints for the Detection of Small Temperature Differences; 1997, pp. 1-9, NASA Center: Langley Research Center.

T. Liu et al.,; "Rotor blade pressure measurement in a high speed axial compressor using pressure and temperature sensitive paints"; AIAA Aerospace Sciences Meeting and Exhibit; Reno, NV; pp. 1-12; 1997.

Fiber optic sensor; http://en.wikipedia.org/wiki/Fiber_optic_sensor; pp. 1-4; Sep. 22, 2010.

Luxtron Fiber Optic Temperature Measurement Sensors; http://www.lumasenseinc.com/EN/lumasense/luxtron; 2009, LumaSense Technologies, Inc.

Industrial Gas Turbines; http://www.energy.siemens.com/hq/pool/hq/power-generation/gas-turbines/downloads/Industrial%20Gas%20Turbines/Industrial_Gas_Turbines_EN_new.pdf; published by Siemens AG Energy Sector, 2010.

Pressure and Temperature Sensitive Paint; http://www.psp-tsp.com/pdfs/Pressure%20and%20Temperature%20Sensitive%20Paint.pdf; Mar. 2006, Innovative Scientific Solutions, Inc.

Kelly R. Navarra; Master's thesis entitled "Development of the Pressure-Sensitive-Paint Technique for Advanced Turbomachinery Applications;" pp. 1-63; Apr. 24, 1997.

Strain gauges Crack Propagation Gauges, KV Series; http://www.sensors-uk-transducers-instruments.com/strain_gauges/crack.htm; Sensors UK Ltd, United Kingdom; Sep. 1, 2010.

* cited by examiner

SENSOR APPARATUS FOR DETECTING AND MONITORING A CRACK PROPAGATING THROUGH A STRUCTURE

FIELD OF THE INVENTION

The present invention relates to a sensor apparatus for detecting and monitoring a crack propagating through a substrate.

BACKGROUND OF THE INVENTION

U.S. Patent Application Publication No. 2009/0262331 discloses a crack detection system comprising optical fiber bundles, light detectors and a light source. The optical fiber bundles may be located on an outer surface of an engineering structure, such as a wind turbine rotor blade. Light pulses are provided to the optical fiber bundles. If a crack forms in the blade, one or more fiber bundles may become damaged causing light to be reflected back toward one or more corresponding light detectors. If the fiber bundles are not damaged, the pulsed light will travel through the fiber bundles and exit out an opposite end. In a further embodiment, the detectors are located at ends of the fiber bundles opposite the ends near the light source. If a fiber bundle becomes damaged due to a crack forming in the blade, a corresponding light detector will sense a decrease in the amount of light passing through the fiber bundle.

SUMMARY OF THE INVENTION

In accordance with a first aspect of the present invention, a sensor apparatus is provided for detecting and monitoring a crack propagating through a structure. The sensor apparatus comprises: light source apparatus; detector structure; and a plurality of optical fibers having proximal and distal ends. The fibers may be spaced apart from one another and associated with the structure such that as a crack propagates through the structure, one or more of the optical fibers is broken by the crack. The optical fibers may receive light at the fiber proximal ends and the optical fibers may have a coating on the fiber distal ends capable of causing light to be returned toward the fiber proximal ends. Unbroken ones of said optical fibers return light at a high intensity to the detector structure.

The fibers may be bonded to the structure.

The fibers may be incorporated into the structure.

The fibers may be positioned in corresponding grooves formed in the structure.

The fibers may be positioned in a parallel grid pattern substantially perpendicular to an expected crack direction.

In one embodiment, the tip or distal end coating comprises one of a fluorescent coating and a phosphorescent coating. The detector structure may comprise: first focusing optics for focusing light into one of the fibers and providing returned light from the one fiber to a beam splitter; the beam splitter for directing returned light from the first focusing optics along a detection path; a filter for blocking illuminating laser light traveling along the detection path while allowing the returned light to pass; and second focusing optics for focusing the returned light toward a sensor array. One element of the sensor array detects the returned light and generates detection signals corresponding to the one fiber. The detector structure further comprises a processing system coupled to the sensor array for receiving and processing the detection signals. The sensor array may comprise a CCD array or a photodetector array and the processing system may comprise a microprocessor based data system or a computerized data acquisition system.

A temperature at a fiber distal end corresponding to a temperature of the structure may be determined by the processor based on the intensity of the returned light.

Alternatively, a temperature at a fiber distal end corresponding to the temperature of the structure may be determined by the processor based on a decay of the returned light.

The processor may generate an output signal or visual display which correlates a number of damaged fibers detected to a length of the crack.

In another embodiment, the coating may comprise a reflective coating. The light source may comprise a pulsed laser. The detector structure may comprise: first focusing optics for focusing light into one of the fibers and providing returned light from the one fiber to a beam splitter; the beam splitter for directing reflected light from the first focusing optics along a detection path; second focusing optics for focusing the reflected light toward a sensor array; and a processing system coupled to the sensor array. One element of the sensor array may detect the reflected light and generate detection signals corresponding to the one fiber. The processing system receives and processes the detection signals.

In accordance with a second aspect of the present invention, a sensor apparatus is provided for detecting and monitoring a crack propagating through a structure. The sensor apparatus comprises: light source apparatus; detector structure; and a plurality of optical fiber pairs comprising first and second optical fibers. The fiber pairs may be spaced apart from one another and associated with the structure. The first optical fibers receive light and when a pair of the first and second fibers is undamaged, the corresponding second optical fiber returns light to the detector structure at a high intensity.

In one embodiment, the first and second optical fibers comprise a continuous optical fiber formed from a continuous loop.

The sensor apparatus may further comprise mirror structure associated with each of the pairs of first and second fibers for reflecting light from each of the first optical fibers to a corresponding one of the second optical fibers.

DETAILED DESCRIPTION OF THE INVENTION

Figure 1:
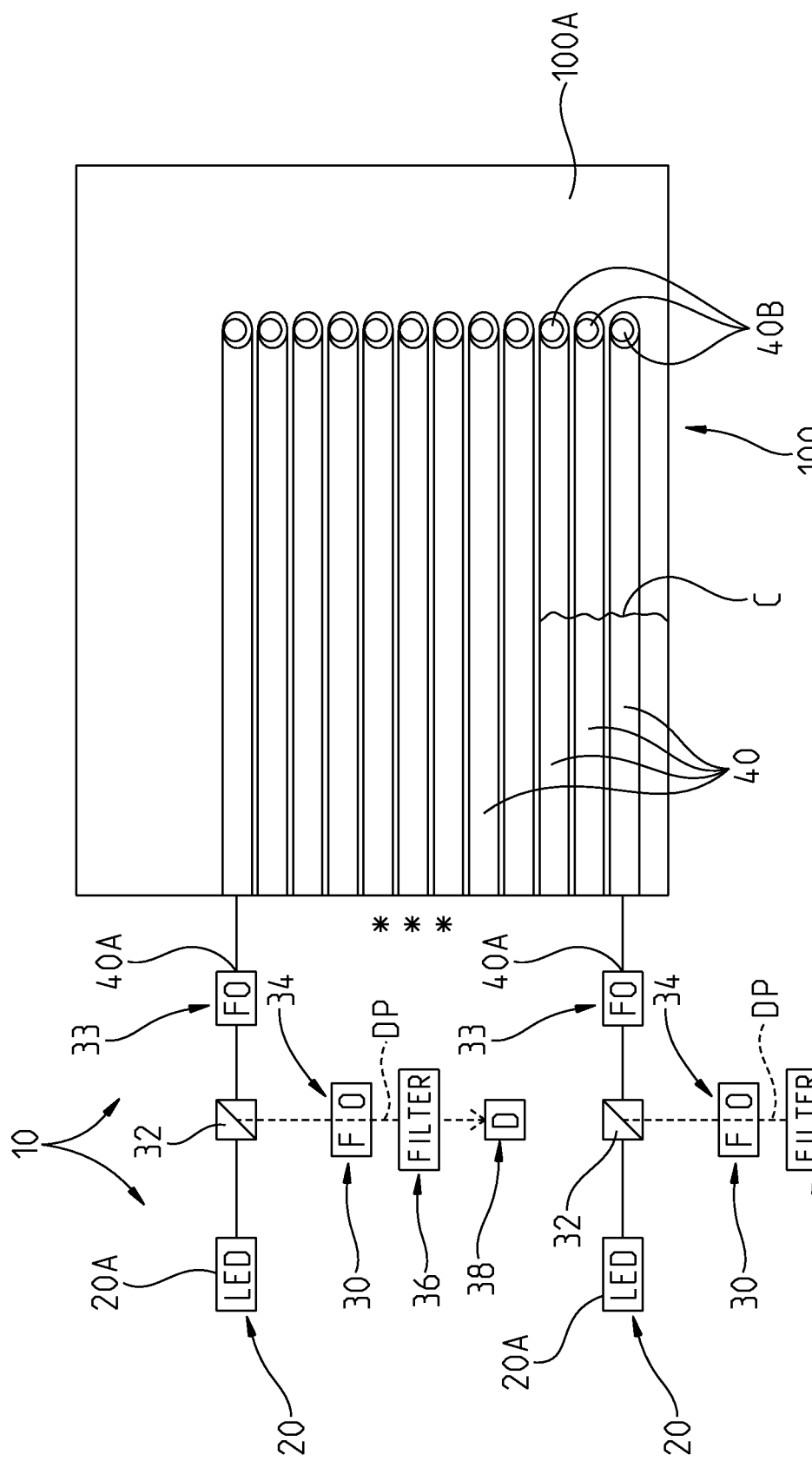
FIG. 1 schematically illustrates a structure and a sensor apparatus coupled to the structure for detecting and monitoring a crack propagating through the structure.
Figure 4:
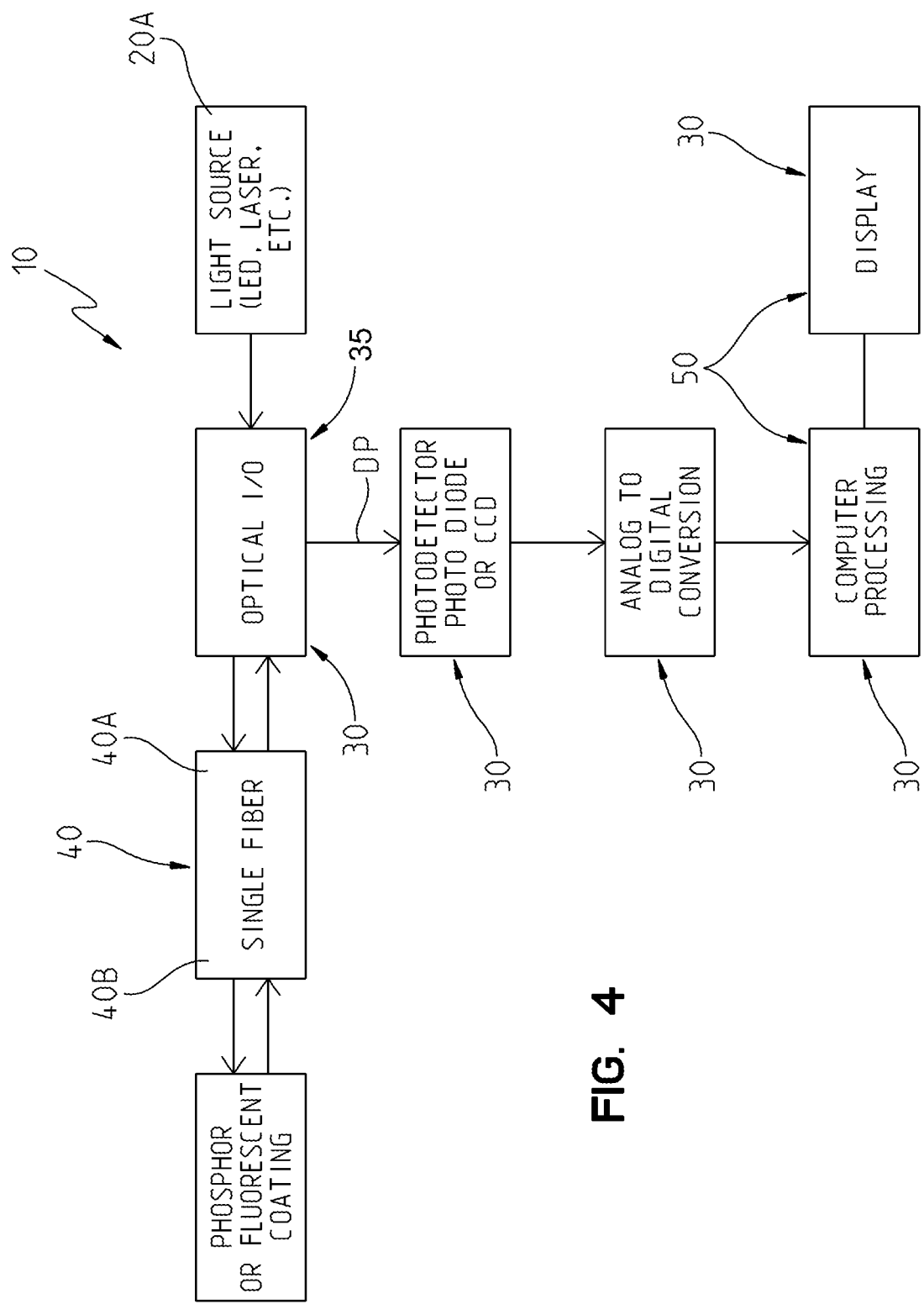
FIG. 4 is a block diagram illustrating a sensor apparatus constructed in accordance with a first embodiment of the present invention, wherein ends of optical fibers are coated with a phosphorescent or fluorescent coating.

A sensor apparatus 10 constructed in accordance with a first embodiment of the present invention for detecting and monitoring a crack C propagating through a structure 100 is illustrated in FIGS. 1 and 4. The structure 100 may comprise a blade in a windmill, a disc or blade in a gas turbine engine, a window frame in an aircraft, a fuselage in an aircraft, or the like.

Figure 2A:
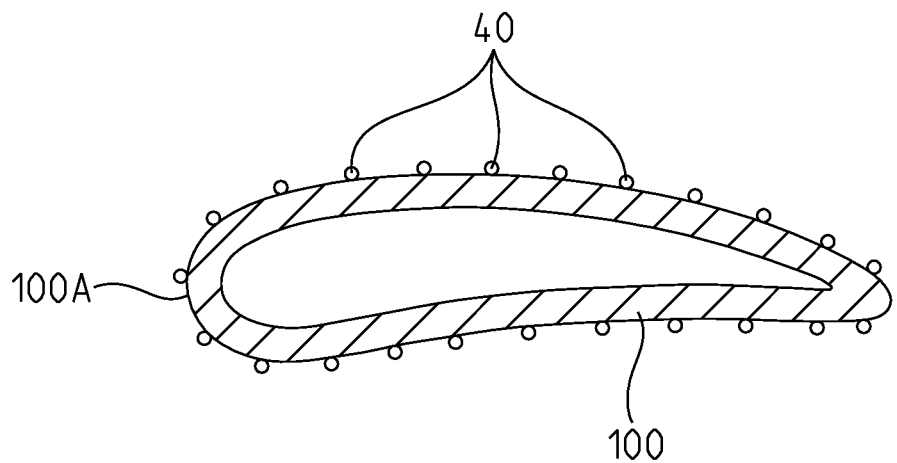
FIG. 2A is a cross-sectional view taken through the structure illustrating a plurality of optical fibers bonded to an outer surface of the structure.

The sensor apparatus 10 comprises a light source apparatus 20, a detector structure 30 and a plurality of optical fibers 40. In the embodiment illustrated in FIGS. 1 and 2A, the optical fibers 40 are coupled, such as by bonding using a conventional epoxy or cement, to an outer surface 100A of the structure 100 in a region of expected crack initiation. Preferably, the fibers 40 are positioned in a parallel grid pattern substantially perpendicular to an expected crack direction, see FIG. 1. In FIG. 1, a crack C is shown propagating through the structure 100. The optical fibers 40 in FIG. 1 are spaced apart from one another and generally positioned so as to extend in a direction substantially perpendicular to the direction of propagation of the crack C.

Figure 2B:
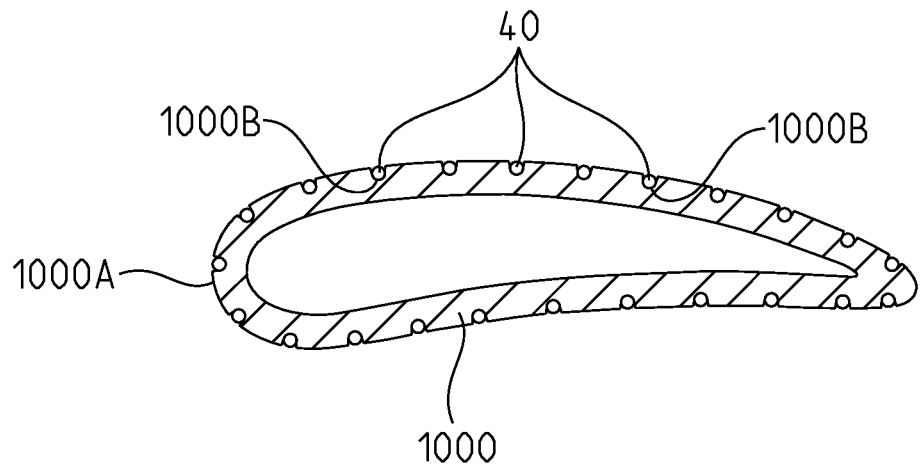
FIG. 2B is a cross-sectional view taken through the structure illustrating a plurality of optical fibers located within grooves and bonded to the structure.

In a first alternative embodiment illustrated in a FIG. 2B, the optical fibers 40 are positioned in grooves 1000B formed in the outer surface 1000A of the structure 1000. The fibers 40 are bonded within the grooves 1000B, such as by a conventional epoxy or cement.

Figure 3:
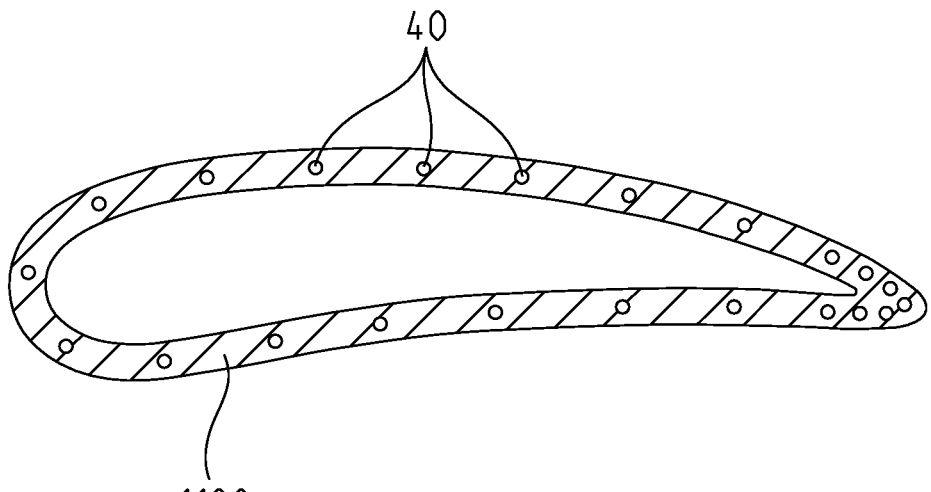
FIG. 3 is a cross-sectional view taken through the structure illustrating a plurality of optical fibers incorporated into the structure.

In a second alternative embodiment illustrated in FIG. 3, the optical fibers 40 are incorporated into the structure 1100.

The optical fibers 40 have proximal and distal ends, 40A and 40B, respectively, see FIGS. 1 and 4. In the embodiment of FIGS. 1 and 4, the optical fiber distal ends 40B are coated with a phosphorescent or a fluorescent coating, such as europium (III) thenoyltrifluoroacetonate, also known as EuTTA, a fluorescent material, Ruthenium(II) bis(2,2:6,2-terpyridine), also known as Ru(trpy), a fluorescent material or YAG:Cr material $(Y_3Al_5O_{12}:Cr^{3+})$, a phosphorescent material. Once exposed to incoming or illuminating light or radiation, the phosphorescent or fluorescent coating on the distal ends 40B is excited so as to emit light at a different, i.e., shifted, wavelength from that of the illuminating light.

When a crack C propagates through the structure 100, one or more of the optical fibers 40 positioned directly over the crack C in the structure 100 will be broken by the crack C in the structure 100. Such a break in an optical fiber 40 is caused by an axial strain along the length of the fiber 40. If the optical fiber 40 is broken, illuminating light will not travel beyond the break in the optical fiber 40 to the fiber distal end 40B or, if light travels beyond the break, it will be at a significantly reduced intensity. However, if the fiber 40 is not broken, illuminating light will travel along the entire extent of the fiber 40 to the fiber distal end 40B, which, because it is coated with either a phosphorescent or a fluorescent coating, will return light at a different wavelength from that of the illuminating light. The returned light travels along the same optical fiber 40 as the illuminating light and moves from the distal end 40B to the proximal end 40A.

The light source apparatus 20 comprises, in the illustrated embodiment, a plurality of light-emitting-diodes (LEDs) 20A. More specifically, a single LED 20A is provided for each optical fiber 40, see FIGS. 1 and 4. Alternatively, it is contemplated that the light source apparatus may comprise individual lasers (not shown) corresponding in number to the number of optical fibers 40 provided or a single laser providing light to all of the optical fibers 40. Because the returned light is at a different wavelength from that of the illuminating light, the LEDs 20A may be operated continuously or intermittently during operation of the sensor apparatus 10 in this embodiment.

In the embodiment illustrated in FIGS. 1 and 4, the detector structure 30 comprises a plurality of beam splitters 32, one for each optical fiber 40, a plurality of first focusing optics 33, one for each optical fiber 40, a plurality of second focusing optics 34, one for each optical fiber 40, a plurality of filters 36, one for each optical fiber 40, and a plurality of photodetectors 38, one for each optical fiber 40. Each set of a beam splitter 32, a first focusing optics 33, a second focusing optics 34 and a filter 36 for a given optical fiber 40 is referred to herein as an optical input/output unit 35, see FIG. 4.

Each beam splitter 32 allows a portion of illuminating light from a corresponding LED 20A to pass therethrough for illuminating its corresponding optical fiber 40. After passing through the beam splitter 32, the light passes through first focusing optics 33, which focuses the light such that it enters the corresponding optical fiber 40. The first focusing optics 33 may comprise a conventional ball lens. The fibers 40 are positioned adjacent to their corresponding first focusing optics 33 to receive illuminating light from the first focusing optics 33 and to pass returned light to the first focusing optics 33. As noted above, returned light travels along each optical fiber 40, from the fiber distal end 40A to the fiber proximal end 40. The returned light, after leaving the proximal end 40A of a given optical fiber 40, passes through its corresponding first focusing optics 33 and the beam splitter 32. The beam splitter 32 directs a portion of the returned light along a detection path DP. As the returned light travels along the detection path DP, it passes through corresponding second focusing optics 34, a corresponding filter 36 and is received by a corresponding photodetector 38. Each one of the second focusing optics 34 may comprise a focusing lens for focusing the returned light onto the corresponding photodetector 38. Each filter 36 functions to block illuminating light that might be traveling along the detection path DP while allowing returned light to pass therethrough. Each photodetector 38 functions to sense returned light and, upon sensing returned light, generates a corresponding detection signal indicating that returned light has been emitted by a corresponding optical fiber 40.

When returned light is sensed by a photodetector 38 at a high intensity, this indicates that its corresponding optical fiber 40 is unbroken. The value or magnitude of "high intensity" returned light may be determined when the installation of the sensor apparatus 10 occurs with all optical fibers 40 unbroken such that "high intensity" returned light has a magnitude substantially equal to a magnitude for returned light when the sensor apparatus 10 is initially installed and all fibers 40 are unbroken. All measurements made for returned light going forward would be relative to the initial "unbroken fiber" or initial "high intensity" returned light level. It is also contemplated that a threshold magnitude may be determined, below which returned light is considered no longer at a high intensity but, rather, at a significantly decreased intensity. The threshold magnitude may be determined in a laboratory using samples of broken fibers, and determining the intensity of light capable of passing through the samples of broken fibers. A light intensity magnitude value slightly greater than an average of the light intensity magnitude passing through the broken fibers would define the threshold magnitude. For example, if returned light is sensed below a threshold magnitude, which may be 10% of the initial returned light high intensity magnitude, then that returned light may be considered not at a high intensity, but, instead at a significantly decreased intensity. An unbroken optical fiber 40 indicates that no crack in the structure 100 is at the location of that optical fiber 40. When returned light is not sensed by the photodetector 38 or is sensed at a significantly decreased intensity, this indicates that the optical fiber 40 is broken, which, in turn, indicates that a crack C in the structure 100 has propagated to a point at the location of that optical fiber 40.

The photodetectors 38 may be defined by a charged-coupled device (CCD) array, a photodetector array, individual photodetectors not combined into an array or any other sensor apparatus capable of sensing returned light.

The detector structure 30 may further comprise a processing system 50 coupled to the photodetectors 38 for receiving and processing the detection signals. The processing system 50 may comprise an analog-to-digital converter for digitizing the electrical signals from the photodetectors 38, a microprocessor based data system, a computerized data acquisition system or other like processing apparatus for receiving the digitized signals from the analog-to-digital converter and a corresponding display.

As discussed above, the optical fibers are spaced apart from one another and associated with the structure 100. As a crack C propagates through the structure 100, one or more of the optical fibers 40 may be broken by the crack C. The processing system 50 may generate and display data indicating the location and length of a crack C in the structure 100 based on the number of optical fibers 40 that are broken, as indicated by their corresponding photodetectors 38 not sensing returned light from those optical fibers 40 or sensing returned light at a significantly decreased intensity, as well as the number of optical fibers 40 which emit returned light at a high intensity to their corresponding photodetectors 38. As noted above, when returned light is not sensed by a photodetector 38 or is sensed at a significantly decreased intensity, this is indicative that its corresponding optical fiber 40 is damaged or broken.

In the embodiment illustrated in FIGS. 1 and 4, when the LEDs 20A are operated continuously, a temperature at an optical fiber distal end, which corresponds to the temperature of the structure 100, may be determined by the processing system 50 based on the intensity of the returned light emitted by an optical fiber 40 having a distal end 40A coated with either a phosphorescent or a fluorescent coating.

In the embodiment illustrated in FIGS. 1 and 4, when the LEDs 20A are pulsed or operated intermittently, a temperature at an optical fiber distal end, which correspontes to the temperature of the structure 100 may be determined by the processing system 50 based on a decay of the returned light emitted by an optical fiber 40 having a distal end 40A coated with either a phosphorescent or a fluorescent coating.

Figure 5:
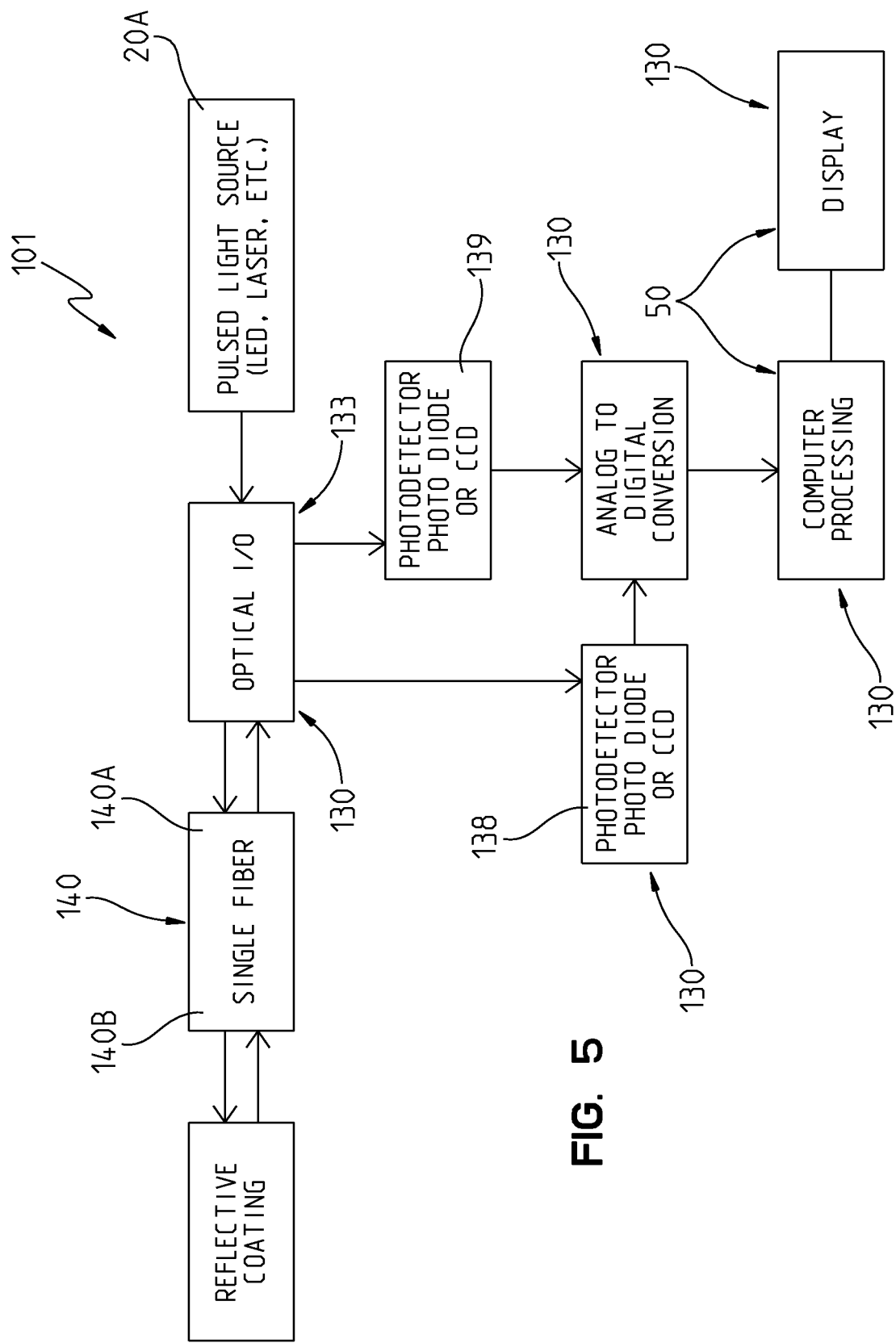
FIG. 5 is a block diagram illustrating a sensor apparatus constructed in accordance with a second embodiment of the present invention, wherein ends of optical fibers are coated with a reflective coating.

In accordance with a second embodiment of the present invention, illustrated in FIG. 5, where elements common to the embodiment of FIGS. 1 and 4 and the embodiment of FIG. 5 are referenced by the same reference numerals, a sensor apparatus 101 is provided for detecting and monitoring a crack propagating through a structure 100.

In this embodiment, the sensor apparatus 101 comprises a light source apparatus, a detector structure 130 and a plurality of optical fibers 140 (only a single optical fiber 140 is illustrated in FIG. 5). The plurality of optical fibers 140 are coupled, such as by bonding using a conventional epoxy or cement, to an outer surface of a structure in a region of expected crack initiation, in the same manner that the optical fibers 40 are coupled to the structure 100 in FIG. 1. Preferably, the fibers 140 are positioned in a parallel grid pattern substantially perpendicular to an expected crack direction.

The optical fibers 140 include proximal 140A and distal ends 140B. The distal ends 140B may be coated with a reflective coating, such as aluminum, i.e., silvering. Once exposed to incoming or illuminating light or radiation, the distal ends 140B, coated with a reflective coating, reflect light back towards their proximal ends 140A.

When a crack C propagates through the structure 100, one or more of the optical fibers 140 positioned directly over the crack C in the structure 100 will be broken by the crack C in the structure 100. Such a break in an optical fiber 140 is caused by an axial strain along the length of the fiber 140. If the optical fiber 140 is broken, illuminating light will not travel beyond the break in the optical fiber 140 to the fiber distal end 140B or if light travels beyond the break, it will be at a significantly reduced intensity. However, if the fiber 140 is not broken, illuminating light will travel along the entire extent of the fiber 140 to the fiber distal end 140B, which, because it is coated with a reflective coating, will return light at substantially the same wavelength as that of the illuminating light. The returned/reflected light travels along the same optical fiber 140 as the illuminating light and moves from the distal end 140B to the proximal end 140A.

The light source apparatus comprises, in the illustrated embodiment, a plurality of light-emitting-diodes (LEDs) 20A. More specifically, a single LED 20A is provided for each optical fiber 140, see FIG. 5. Preferably, the LEDs 20A are operated intermittently, i.e., pulsed, during operation of the sensor apparatus 101 in this embodiment.

In the embodiment illustrated in FIG. 5, the detector structure 130 comprises a plurality of beam splitters (not shown), one for each optical fiber 140, a plurality of first focusing optics, (not shown), one for each optical fiber 140, a plurality of second focusing optics (not shown), one for each optical fiber 140, and a plurality of photodetectors 138, one for each optical fiber 140. Each set of a first focusing optics, a beam splitter and a second focusing optics for a given optical fiber 140 is referred to herein as an optical input/output unit 133, see FIG. 5.

Each beam splitter allows a portion of illuminating light from a corresponding LED 20A to pass therethrough for illuminating its corresponding optical fiber 140. The fibers 140 are positioned adjacent to their corresponding first focusing optics to receive illuminating light from the first focusing optics and to pass reflected light to the first focusing optics. Reflected light travels along each optical fiber 140, from the fiber distal end 140B to the fiber proximal end 140A. The reflected light, after leaving the proximal end 140A of a given optical fiber 140, passes through its corresponding first focusing optics and into its corresponding beam splitter. The beam splitter directs a portion of the reflected light along a detection path DP. As the reflected light travels along the detection path DP, it passes through a corresponding second focusing optics, and is received by a corresponding photodetector 138. Each photodetector 138 functions to sense reflected light and, upon sensing reflected light, generates a corresponding detection signal indicating that reflected light has been emitted by a corresponding optical fiber 140. The processing system 50, noted below, looks for a detection signal occurring during a time interval/window, which time interval/window is defined as occurring a predefined time period following the generation of an illuminating light beam.

It is contemplated that further photodetectors 139 may be provided for sensing light generated by corresponding LEDs 20A, thus confirming that each LED 20A is operational.

When reflected light at a high intensity is sensed by a photodetector 138 during the time internal/window, this indicates that its corresponding optical fiber 140 is not broken. The value or magnitude of "high intensity" returned light may be determined as discussed above when the installation of the sensor apparatus 101 occurs with all optical fibers 140 unbroken such that "high intensity" returned light has a magnitude substantially equal to a magnitude for returned light when the sensor apparatus 101 is initially installed and all fibers 140 are unbroken. An undamaged optical fiber 140 indicates that no crack in the structure 100 is at the location of that optical fiber 140. When reflected light is not sensed by the photodetector 138 or reflected light is sensed at a significantly reduced intensity during the time interval/window, this indicates that the optical fiber 140 is broken, which, in turn, indicates that a crack C in the structure 100 has propagated to a point at the location of that optical fiber 140.

The photodetectors may be defined by a charged-coupled device (CCD) array, a photodetector array, individual photodetectors not combined into an array or any other sensor apparatus capable of sensing returned light.

The detector structure 130 may further comprise a processing system 50 coupled to the photodetectors for receiving and processing the detection signals. The processing system 50 may comprise an analog-to-digital converter for digitizing the electrical detection signals from the photodetectors 138, a microprocessor based data system, a computerized data acquisition system or other like processing apparatus for receiving the digitized signals from the analog-to-digital converter and a corresponding display.

As discussed above, the optical fibers are spaced apart from one another and associated with the structure 100. As a crack C propagates through the structure 100, one or more of the optical fibers 140 may be damaged or broken by the crack C. The processing system 50 may generate and display data indicating the location and length of a crack C in the structure 100 based on the number of optical fibers 140 that are broken, as indicated by their corresponding photodetectors not sensing returned light or sensing light at a significantly decreased intensity from those optical fibers 140 during a time interval/window, as well as the number of optical fibers 140 which emit returned light at a high intensity to their corresponding photodetectors during a time interval/window. As noted above, when reflected light is not sensed by a photodetector or senses light at a significantly decreased intensity during a time interval/window, this is indicative that its corresponding optical fiber 140 is damaged or broken.

Figure 6:
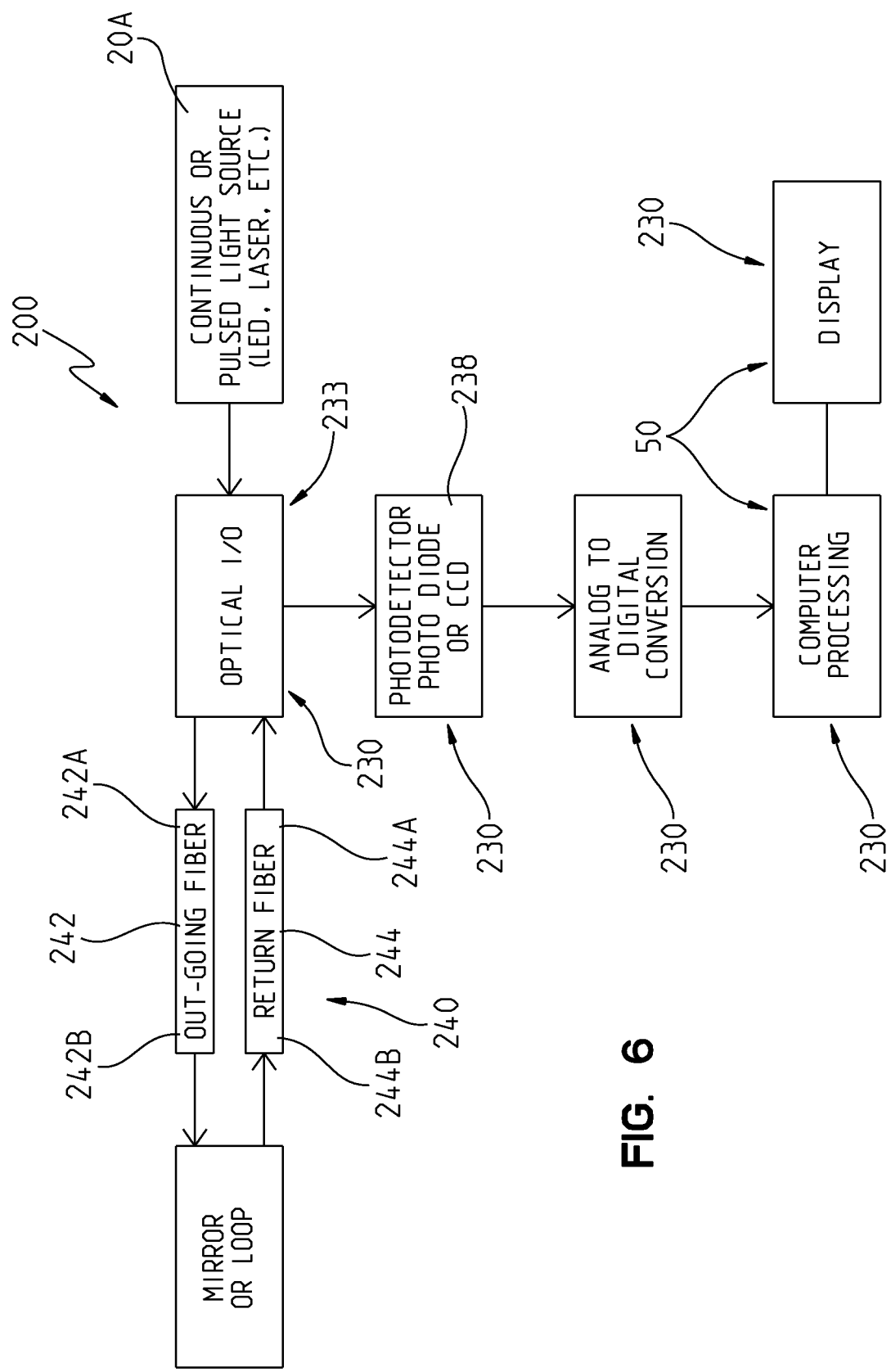
FIG. 6 is a block diagram illustrating a sensor apparatus constructed in accordance with a third embodiment of the present invention, wherein fiber pairs are provided.
Figure 6A:
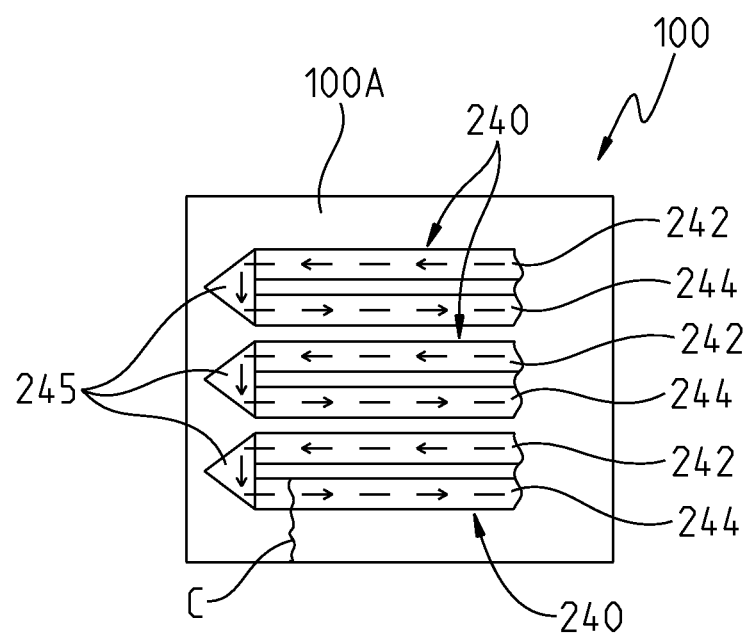
FIG. 6A schematically illustrates a structure and a portion of the sensor apparatus of FIG. 6 coupled to the structure for detecting and monitoring a crack propagating through the structure.

In accordance with a third embodiment of the present invention, illustrated in FIGS. 6 and 6A, where elements common to the embodiment of FIGS. 1 and 4 and the embodiment of FIGS. 6, 6A are referenced by the same reference numerals, a sensor apparatus 200 is provided for detecting and monitoring a crack propagating through a structure 100.

In this embodiment, the sensor apparatus 200 comprises a light source apparatus, a detector structure 230 and a plurality of optical fibers pairs 240 comprising first and second optical fibers 242 and 244 (only a single pair 240 is illustrated in FIG. 6). The plurality of optical fiber pairs 240 are coupled, such as by bonding using a conventional epoxy or cement, to an outer surface 100A of a structure 100 in a region of expected crack initiation, see FIG. 6A. Preferably, the fiber pairs 240 are positioned in a parallel grid pattern substantially perpendicular to an expected crack direction. More specifically, pairs 240 of first and second fibers 242 and 244 are spaced apart from one another and positioned in a parallel grid pattern, see FIG. 6A

The optical fibers 242 and 244 include proximal 242A and 244A and distal ends 242B and 244B. A mirror structure or reflector 245 is associated with each pair of first and second optical fibers 242 and 244, see FIG. 6A. The reflector 245 is positioned adjacent the distal ends 242B and 244B of the first and second fibers 242 and 244 so as to reflect illuminating light exiting a first fiber distal end 242B into a second fiber distal end 244B.

When a crack C propagates through the structure 100, one or more of the optical fibers 242 and 244 positioned directly over the crack C in the structure 100 will be broken by the crack C in the structure 100. Such a break in an optical fiber 242, 244 is caused by an axial strain along the length of the fiber 242, 244. If an optical fiber 242 and 244 is broken, illuminating light will not travel beyond the break in the optical fiber 242 and 244 or the light will be significantly reduced in intensity. However, if the first and second fibers 242 and 244 of a fiber pair 240 are not broken, illuminating light will travel along the entire extent of the first fiber 242 to the first fiber distal end 242B. A corresponding reflector 245 will then reflect the light into the distal end 244B of the second optical fiber 244, where it will travel along the entire extent of the second fiber 244 and exit the proximal end 244A of the second optical fiber 244.

The light source apparatus comprises, in the illustrated embodiment, a plurality of light-emitting-diodes (LEDs) 20A. More specifically, a single LED 20A is provided for each optical fiber pair 240, see FIG. 6. The LEDs 20A may be operated continuously or intermittently, i.e., pulsed, during operation of the sensor apparatus 200 in this embodiment.

In the embodiment illustrated in FIG. 6, the detector structure 230 comprises a plurality of first focusing optics (not shown), one for each optical fiber pair 240, a plurality of second focusing optics (not shown), one for each optical fiber pair 240, and a plurality of photodetectors 238, one for each optical fiber pair 240. Each set of a first and second focusing optics for a given optical fiber pair 240 is referred to herein as an optical input/output unit 233, see FIG. 6. Each of the first and second focusing optics may comprise a conventional ball lens.

Each first focusing optics focuses a portion of illuminating light from a corresponding LED 20A such that it passes into its corresponding first optical fiber 242. The first fibers 242 are positioned adjacent to their corresponding first focusing optics to receive illuminating light from the first focusing optics, while their corresponding second optical fibers 244 pass reflected light to the second focusing optics. Reflected light travels along each second optical fiber 244, from the second fiber distal end 244B to the second fiber proximal end 244A. The reflected light, after leaving the proximal end 244A of a given second optical fiber 244, passes through its corresponding second focusing optics. The second focusing optics directs the reflected light onto a corresponding photodetector 238. Each photodetector 238 functions to sense returned light and, upon sensing returned light, generates a corresponding detection signal indicating that returned light has been emitted by a corresponding second optical fiber 244.

When reflected light is sensed by a photodetector 238 at a high intensity, this indicates that its corresponding first and second optical fibers 242 and 244 are not broken. The value or magnitude of "high intensity" returned light may be determined as discussed above when the installation of the sensor apparatus 200 occurs with all optical fibers 242, 244 unbroken such that "high intensity" returned light has a magnitude substantially equal to a magnitude for returned light when the sensor apparatus 200 is initially installed and all fibers 242, 244 are unbroken. Unbroken first and second optical fibers 242 and 244 indicate that no crack in the structure 100 is at the location of that optical fiber pair 240. When reflected light is not sensed by the photodetector 238 or is sensed at a significantly reduced intensity, this indicates that one or both of the first and second optical fibers 242 and 244 of the optical fiber pair 240 is broken, which, in turn, indicates that a crack C in the structure 100 has propagated to a point at the location of that optical fiber pair 240.

The photodetectors may be defined by a charged-coupled device (CCD) array, a photodetector array, individual photodetectors not combined into an array or any other sensor apparatus capable of sensing returned light.

The detector structure 230 may further comprise a processing system 50 coupled to the photodetectors for receiving and processing the detection signals. The processing system 50 may comprise an analog-to-digital converter for digitizing the electrical signals from the photodetectors 238, a microprocessor based data system, a computerized data acquisition system or other like processing apparatus for receiving the digitized signals from the analog-to-digital converter and a corresponding display.

As discussed above, the optical fiber pairs 240 are spaced apart from one another and associated with the structure 100. As a crack C propagates through the structure 100, one or more of the optical fibers 242, 244 may be broken by the crack C. The processing system 50 may generate and display data indicating the location and length of a crack C in the structure 100 based on the number of optical fiber pairs 240 having a first optical fiber 242 and/or a second optical fiber 244 broken.

In place of the reflectors 245, each pair of first and second optical fibers 242 and 244 may comprise a single optical fiber having a loop joining the first and second optical fibers 242 and 244 together. Hence, each single optical fiber comprises first and second optical fibers connected by the loop, wherein the first and second optical fibers are positioned adjacent and generally parallel to one another. Illuminating light enters the proximal end of the single optical fiber and may exit the distal end of the single optical fiber and be sensed by a corresponding detector 238. A plurality of the single fibers each having a loop are positioned in a parallel grid pattern substantially perpendicular to an expected crack direction.

While particular embodiments of the present invention has been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A sensor apparatus for detecting and monitoring a crack propagating through a main structure comprising:
    light source apparatus;
    detector structure; and
    a plurality of optical fibers having proximal and distal ends, said fibers being spaced apart from one another and associated with the main structure such that as a crack propagates through the main structure, one or more of said optical fibers is broken by the crack, said optical fibers receiving light at said fiber proximal ends and said optical fibers having a coating on said fiber distal ends capable of causing light to be returned toward said fiber proximal ends, unbroken ones of said optical fibers returning light at a high intensity to said detector structure;

wherein said detector structure comprises:
    sensor structure detecting returning light and generating detection signals; and
    a processing system coupled to said sensor structure for receiving and processing said detection signals, wherein said processing system generates an output signal which correlates a number of damaged fibers detected to a length of the crack.

2. The sensor apparatus as set out in claim 1, wherein said fibers are bonded to the main structure.

3. The sensor apparatus as set out in claim 1, wherein said fibers are incorporated into the main structure.

4. The sensor apparatus as set out in claim 1, wherein said fibers are positioned in corresponding grooves formed in the main structure.

5. The sensor apparatus as set out in claim 1, wherein said fibers are positioned in a parallel grid pattern substantially perpendicular to an expected crack direction.

6. The sensor apparatus as set out in claim 1, wherein said coating comprises one of a fluorescent coating and a phosphorescent coating.

7. The sensor apparatus as set out in claim 6, wherein said detector structure further comprises:
    first focusing optics for focusing light into one of said fibers and providing returned light from said one fiber to a beam splitter;
    said beam splitter directing the returned light from said first focusing optics along a detection path;
    a filter for blocking illuminating light traveling along said detection path while allowing the returned light to pass;
    second focusing optics for focusing the returned light toward a sensor array defining said sensor structure;
    said sensor array detecting the returned light and generating detection signals corresponding to said one fiber; and
    said processing system coupled to said sensor array for receiving and processing said detection signals.

8. The sensor apparatus as set out in claim 7, wherein said sensor array comprises a CCD array or a photodetector array and said processing system comprises a microprocessor or a computerized data acquisition system.

9. The sensor apparatus as set out in claim 8, wherein a temperature corresponding to the temperature of the main structure is determined by said processing system based on the intensity of the returned light.

10. The sensor apparatus as set out in claim 8, wherein a temperature corresponding to the temperature of the main structure is determined by said processing system based on a decay of the returned light.

11. The sensor apparatus as set out in claim 1, wherein said coating comprises a reflective coating.

12. The sensor apparatus as set out in claim 11, wherein said light source comprises a pulsed laser.

13. The sensor apparatus as set out in claim 12, wherein said detector structure comprises:
    first focusing optics for focusing light into one of said fibers and providing returned light from said one fiber to a beam splitter;
    said beam splitter for directing reflected light from said first focusing optics along a detection path;
    second focusing optics for focusing the reflected light toward a sensor array defining said sensor structure;
    said sensor array detecting said reflected light and generating detection signals corresponding to said one fiber; and
    said processing system coupled to said sensor array for receiving and processing said detection signals.

14. The sensor apparatus as set out in claim 13, wherein said sensor array comprises a CCD array or a photodetector array and said processing system comprises a microprocessor or a computerized data acquisition system.

15. The sensor apparatus as set out in claim 1, wherein said damaged fibers comprise broken fibers.

* * * * *